US012563550B2

(12) United States Patent
Dai et al.

(10) Patent No.: US 12,563,550 B2
(45) Date of Patent: Feb. 24, 2026

(54) UPLINK DATA CHANNEL REPETITIONS USING MULTIPLE SLOT TRANSMIT TIME INTERVALS

(71) Applicant: QUALCOMM Incorporated, San Diego, CA (US)

(72) Inventors: Jing Dai, Beijing (CN); Chenxi Hao, Beijing (CN); Chao Wei, Beijing (CN); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 18/025,174

(22) PCT Filed: Oct. 9, 2020

(86) PCT No.: PCT/CN2020/119933
§ 371 (c)(1),
(2) Date: Mar. 7, 2023

(87) PCT Pub. No.: WO2022/073184
PCT Pub. Date: Apr. 14, 2022

(65) Prior Publication Data
US 2024/0032024 A1    Jan. 25, 2024

(51) Int. Cl.
*H04W 72/1268* (2023.01)
*H04L 1/08* (2006.01)
*H04W 72/232* (2023.01)

(52) U.S. Cl.
CPC ........... *H04W 72/1268* (2013.01); *H04L 1/08* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 11,743,925 B2 | 8/2023 | Wu et al. | |
| 2019/0349917 A1 | 11/2019 | Huang et al. | |
| (Continued) | | | |

FOREIGN PATENT DOCUMENTS

| | | |
|---|---|---|
| JP | 2020136762 A | 8/2020 |
| KR | 20200060255 A | 5/2020 |
| (Continued) | | |

OTHER PUBLICATIONS

Supplementary European Search Report—EP20956499—Search Authority—The Hague—Jun. 14, 2024.
(Continued)

*Primary Examiner* — Clemence S Han
(74) *Attorney, Agent, or Firm* — Procopio, Cory, Hargreaves & Savitch LLP

(57) ABSTRACT

Apparatus, methods, and computer-readable media for improving uplink data channel repetitions using multiple slot transmit time intervals are disclosed herein. An example method for wireless communication at a user equipment (UE) includes receiving scheduling downlink control information (DCI) indicating, in a time domain resource allocation (TDRA) field, a scaling parameter for a transport block size (TBS) of a physical uplink shared channel (PUSCH) transmission for transmission as PUSCH repetitions over a repetition unit comprising a plurality of single repetitions. The example method also includes transmitting the PUSCH repetitions with scaling based on the scaling parameter indicated in the scheduling DCI.

28 Claims, 11 Drawing Sheets

400

RV0    RV2    RV3    RV1

412

4-slot PUSCH 410

(56)  References Cited

U.S. PATENT DOCUMENTS

| | | | |
|---|---|---|---|
| 2020/0022144 A1* | 1/2020 | Papasakellariou .... | H04L 5/0044 |
| 2020/0267659 A1 | 8/2020 | Molavianjazi et al. | |
| 2022/0116144 A1* | 4/2022 | Liu ....................... | H04L 5/0044 |
| 2023/0137292 A1* | 5/2023 | Zhang ................... | H04L 5/0035 |
| | | | 370/329 |

FOREIGN PATENT DOCUMENTS

| | | | |
|---|---|---|---|
| WO | 2020165835 A1 | 8/2020 |
| WO | 2020206083 A1 | 10/2020 |

OTHER PUBLICATIONS

Intel Corporation: "On PUSCH Enhancements for URLLC", 3GPP TSG RAN WG1 Meeting #99, R1-1912216, Nov. 9, 2019 (Nov. 9, 2019), 8 Pages, section 2.
International Search Report and Written Opinion—PCT/CN2020/119933—ISA/EPO—Jul. 7, 2021.
Panasonic: "HARQ enhancement for NR-U", 3GPP TSG RAN WG1 #98bis, R1-1910840, Oct. 14, 2019-Oct. 20, 2019, Oct. 7, 2019, pp. 1-10.

* cited by examiner

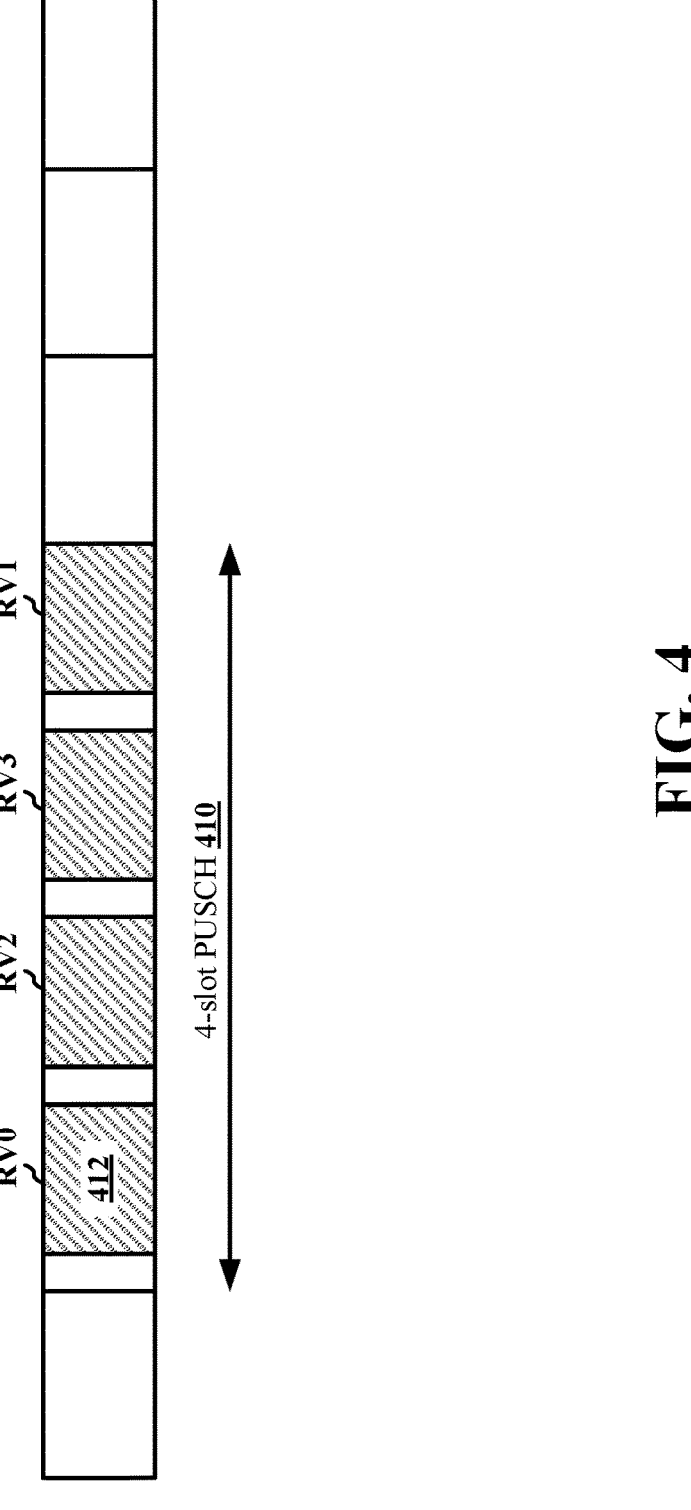
FIG. 4

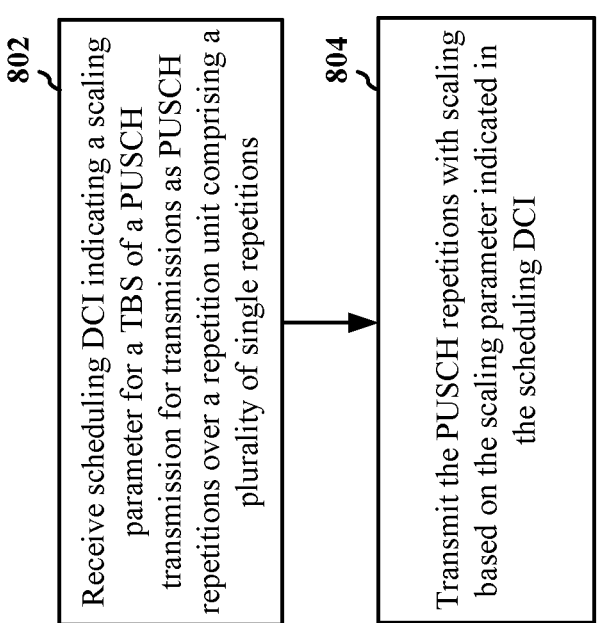
802 — Receive scheduling DCI indicating a scaling parameter for a TBS of a PUSCH transmission for transmissions as PUSCH repetitions over a repetition unit comprising a plurality of single repetitions
804 — Transmit the PUSCH repetitions with scaling based on the scaling parameter indicated in the scheduling DCI
800
FIG. 8

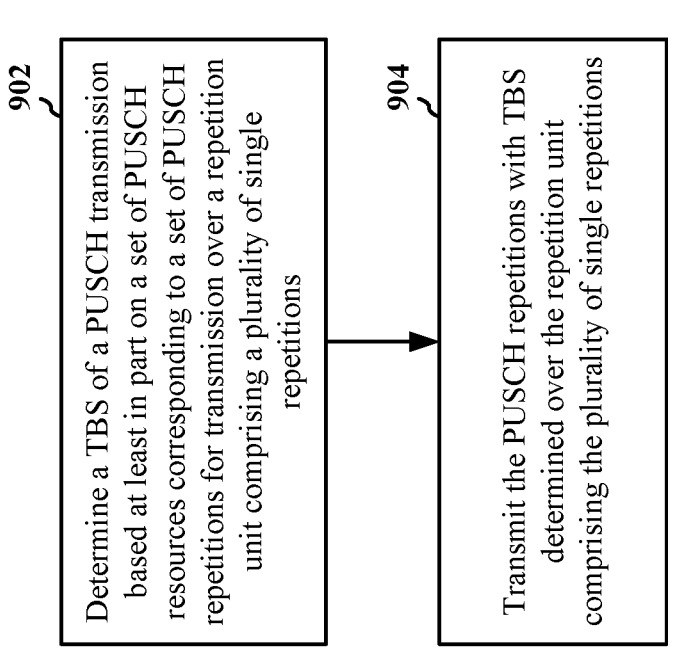
902
Determine a TBS of a PUSCH transmission based at least in part on a set of PUSCH resources corresponding to a set of PUSCH repetitions for transmission over a repetition unit comprising a plurality of single repetitions
904
Transmit the PUSCH repetitions with TBS determined over the repetition unit comprising the plurality of single repetitions
900
FIG. 9

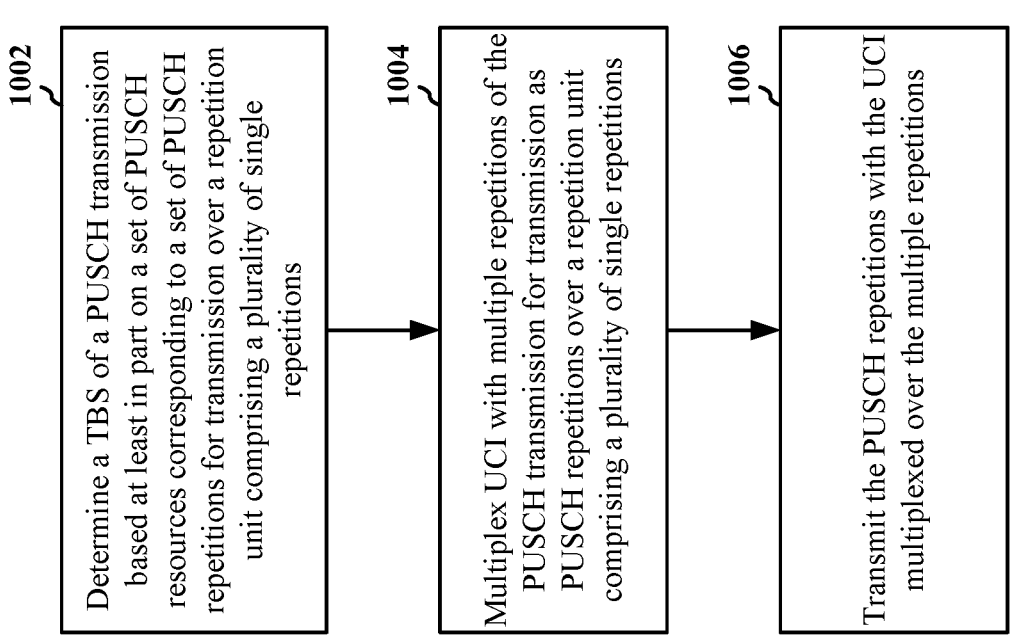

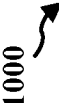

1002

Determine a TBS of a PUSCH transmission based at least in part on a set of PUSCH resources corresponding to a set of PUSCH repetitions for transmission over a repetition unit comprising a plurality of single repetitions

1004

Multiplex UCI with multiple repetitions of the PUSCH transmission for transmission as PUSCH repetitions over a repetition unit comprising a plurality of single repetitions

1006

Transmit the PUSCH repetitions with the UCI multiplexed over the multiple repetitions

UPLINK DATA CHANNEL REPETITIONS USING MULTIPLE SLOT TRANSMIT TIME INTERVALS

CROSS REFERENCE TO RELATED APPLICATION(S)

This application is a National Stage Application filed under 35 U.S.C. § 371 of PCT International Application No. PCT/CN2020/119933, entitled "METHODS AND APPARATUS TO IMPROVE UPLINK DATA CHANNEL REPETITIONS USING MULTIPLE SLOT TRANSMIT TIME INTERVALS" and filed Oct. 9, 2020, which is expressly incorporated by reference herein in its entirety.

BACKGROUND

Technical Field

The present disclosure relates generally to communication systems, and more particularly, to coverage enhancement.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus receives scheduling downlink control information (DCI) indicating, in a time domain resource allocation (TDRA) field, a scaling parameter for a transport block size (TBS) of a physical uplink shared channel (PUSCH) transmission for transmission as PUSCH repetitions over a repetition unit comprising a plurality of single repetitions. The example apparatus also transmits the PUSCH repetitions with scaling based on the scaling parameter indicated in the scheduling DCI.

In another aspect of the disclosure, a method, a computer-readable medium, and an apparatus are provided for wireless communication at a UE. An example apparatus determines a TBS of a PUSCH transmission based at least in part on a set of PUSCH resources corresponding to a set of PUSCH repetitions for transmission over a repetition unit comprising a plurality of single repetitions. The example apparatus also transmits the PUSCH repetitions with the TBS determined over the repetition unit comprising the plurality of single repetitions.

In another aspect of the disclosure, a method, a computer-readable medium, and an apparatus are provided for wireless communication at a UE. An example apparatus determines a TBS of a PUSCH transmission based at least in part on a set of PUSCH resources corresponding to a set of PUSCH repetitions for transmission over a repetition unit comprising a plurality of single repetitions. The example apparatus also multiplexes uplink control information (UCI) with multiple repetitions of the PUSCH transmission for transmission as PUSCH repetitions over the repetition unit comprising the plurality of single repetitions. Additionally, the example apparatus transmits the PUSCH repetitions with the UCI multiplexed over the multiple repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example representation of a multiple-slot PUSCH for uplink transmission by a UE, in accordance with the teachings disclosed herein.

FIGS. 8 to 10 are flowcharts of methods of wireless communication at a UE, in accordance with the teachings disclosed herein.

DETAILED DESCRIPTION

Figure 1:
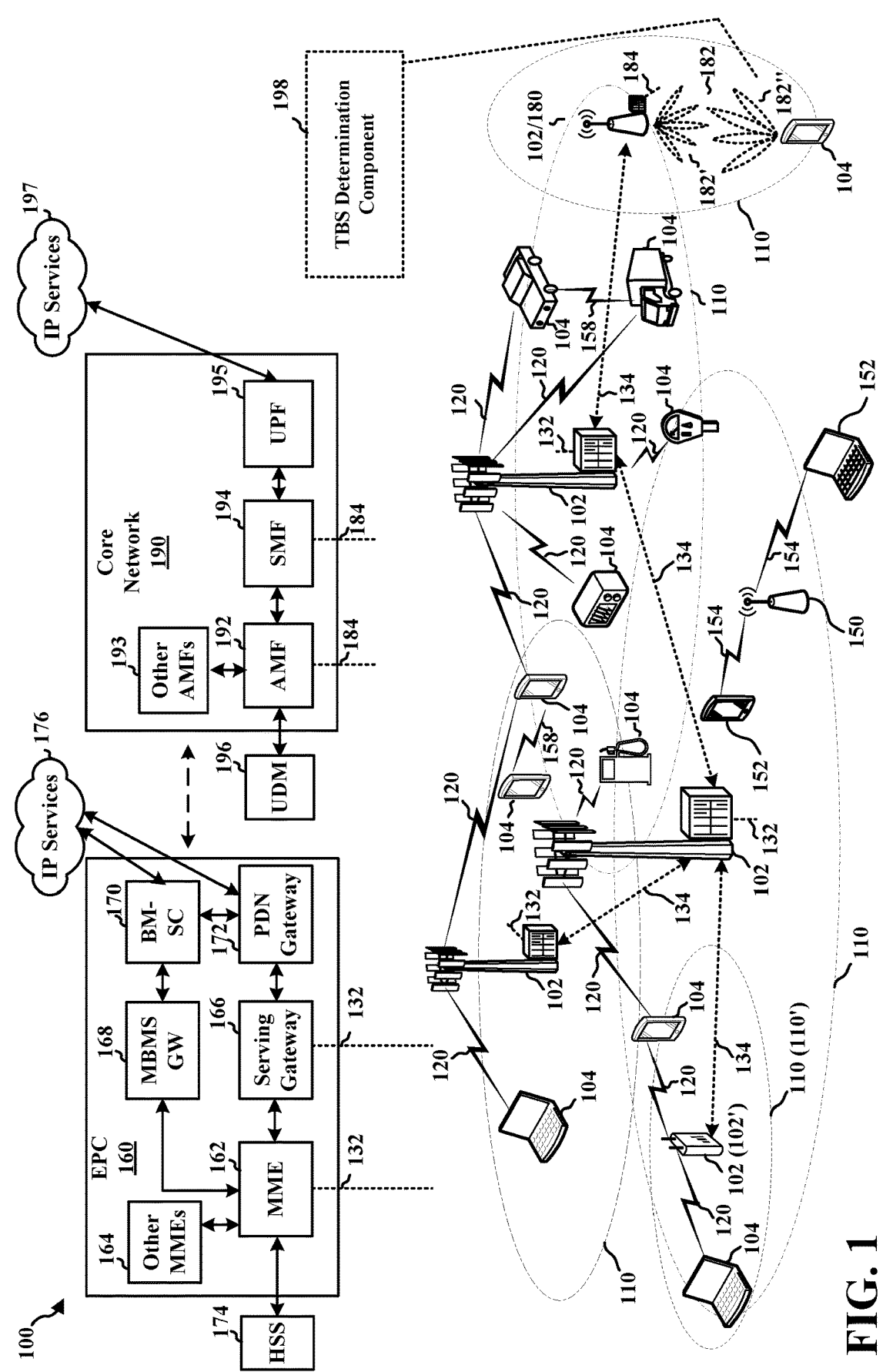
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Example techniques disclosed herein generally relate to improving use of uplink data channel repetitions using multiple-slot transmit time intervals (TTIs). For example, 5G NR may support repeated transmission of an uplink data channel, such as a physical uplink shared channel (PUSCH), over successive slots (e.g., via slot-repetition, aggregation, multiple-slot PUSCH) to, for example, increase the signal-to-noise ratio (SNR) for transmission reliability. For example, PUSCH repetition may be applied to coverage limited scenarios. When PUSCH transmissions are repeated to enhance coverage, a modulation code scheme (MCS) with quadrature phase shift keying (QPSK) may be used as the highest modulation orders (e.g., 16 quadrature amplitude modulation (QAM) or 64 QAM) having a lower radio frequency power efficiency may not be used for coverage limited scenarios. For example, a UE may reduce a maximum output power due to higher order modulations, and the maximum power reduction values for 16 QAM and 64 QAM are larger than QPSK. In particular, even for a maximum supported indicated code rate of "R" for QPSK, the associated effective code rate ($R_{eff}$) of a 4-slot PUSCH (e.g., $R_{eff}$=R/4) or an 8-slot PUSCH (e.g., $R_{eff}$=R/8) may be very low.

However, for uplink coverage limited scenarios where the transmission power of the UE may be a cause of a bottleneck, an increase of bandwidth by a very low $R_{eff}$ may not improve the transmission reliability and may cost more resources. For example, the combined gain of a lower $R_{eff}$ may be offset by the increased noise power due to a higher bandwidth, which may render the additional bandwidth effectively unusable. Therefore, for system capacity improvement, TBS scaling and/or MCS scaling may be implemented for multiple-slot PUSCH. In an example, a code rate or TBS may be scaled up for a four-slot PUSCH (e.g., scaled by a factor of two or four).

Furthermore, to maintain a low peak-to-average power ratio (PAPR) characteristic, a UE may not transmit two uplink channels or signals simultaneously on a same carrier. If a single-slot PUCCH partially or fully overlaps with a single-slot PUSCH, the UE may multiplex the UCI onto the PUSCH transmission (e.g., upon satisfaction of certain conditions, such as a timeline requirement). For example, for multiple-slot PUSCH, if one of the PUSCH transmissions in one slot overlaps with a single-slot PUSCH, and the multiplexing conditions are satisfied, the UCI may be multiplexed on the PUSCH transmission in that slot. For multiple-slot PUSCH transmissions with TBS scaling or MSC scaling, the TBS may be scaled-up. However, as the scaling rate increases, the number of UCI resource elements (REs) may get smaller, resulting in potential loss of UCI transmission reliability on PUSCH.

FIG. 1 is a diagram illustrating an example of a wireless communications system and an access network 100 including base stations 102, base stations 180, and UEs 104.

In some examples, a wireless communication device, such as a UE 104, may be configured to manage one or more aspects of wireless communication by TBS determination. As an example, in FIG. 1, the UE 104 may include a TBS determination component 198 configured to receive scheduling DCI indicating, in a TDRA field, a scaling parameter for a TBS of a PUSCH transmission for transmission as PUSCH repetitions over a repetition unit comprising a plurality of single repetitions. The example TBS determination component 198 may also be configured to transmit the PUSCH repetitions with scaling based on the scaling parameter indicated in the scheduling DCI.

In another aspect of the disclosure, the TBS determination component 198 may be configured to determine a TBS of a PUSCH transmission based at least in part on a set of PUSCH resources corresponding to a set of PUSCH repetitions for transmission over a repetition unit comprising a plurality of single repetitions. The example TBS determination component 198 may also be configured to transmit the PUSCH repetitions with the TBS determined over the repetition unit comprising the plurality of single repetitions.

In another aspect of the disclosure, the TBS determination component 198 may be configured to determine a TBS of a PUSCH transmission based at least in part on a set of PUSCH resources corresponding to a set of PUSCH repetitions for transmission over a repetition unit comprising a plurality of single repetitions. The example TBS determination component 198 may also be configured to multiplex UCI with multiple repetitions of the PUSCH transmission for transmission as PUSCH repetitions over the repetition unit comprising the plurality of single repetitions. Additionally, the example TBS determination component 198 may also be configured to transmit the PUSCH repetitions with the UCI multiplexed over the multiple repetitions.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes the base stations 102, the base stations 180, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
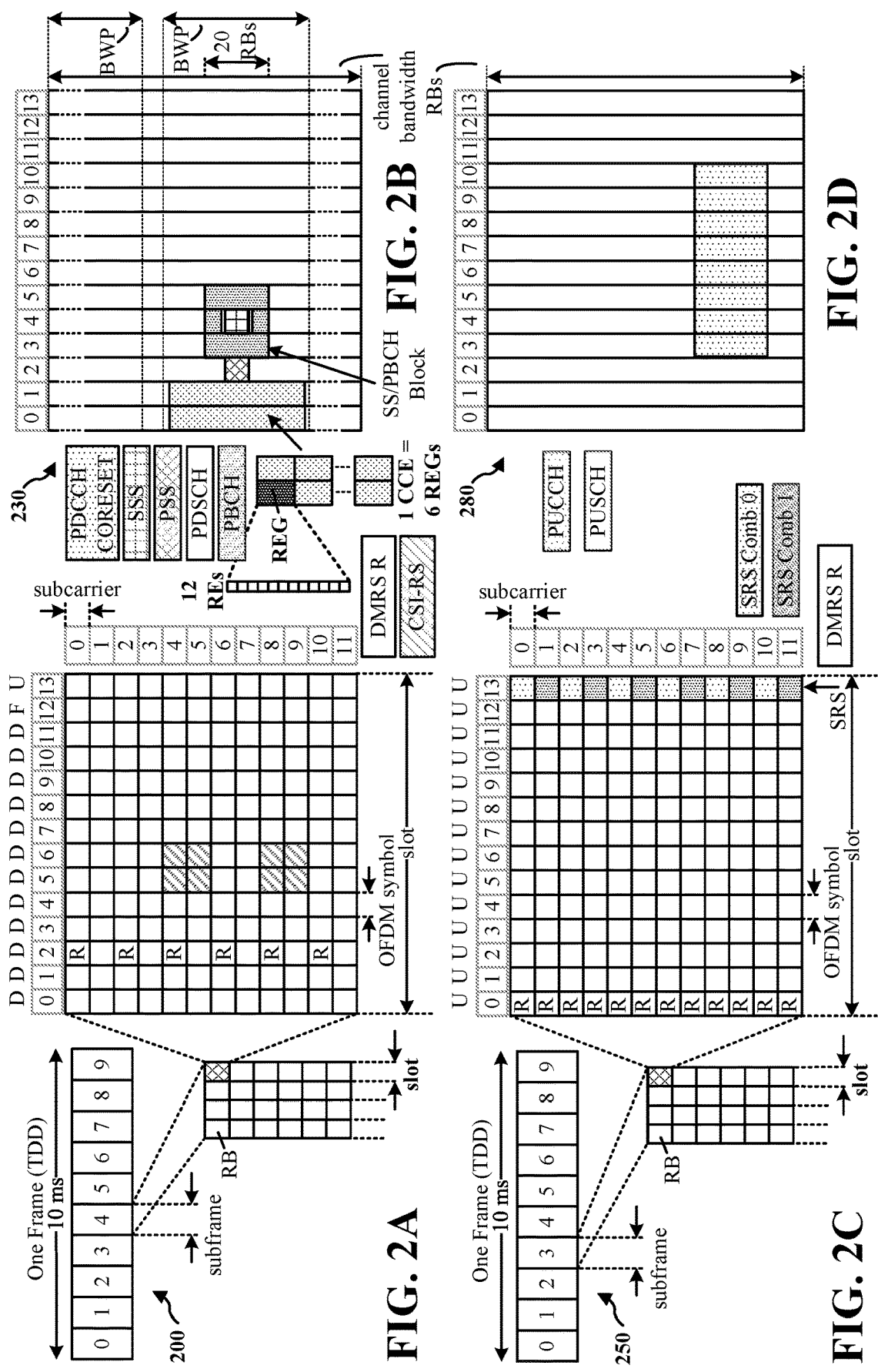
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
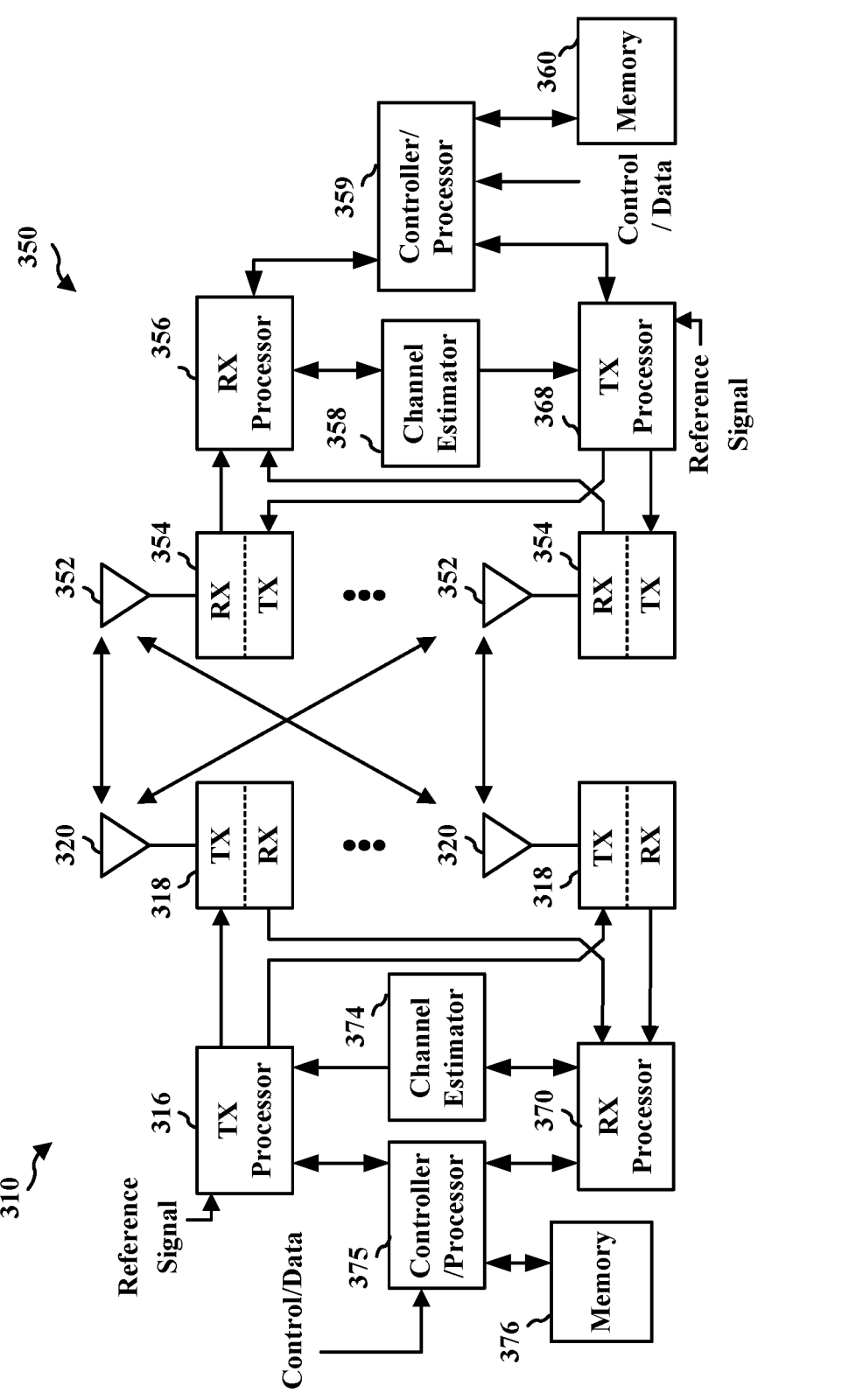
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TBS determination component 198 of FIG. 1.

FIG. 4 is an example representation of a multiple-slot PUSCH 400 for uplink transmission by a UE, such as the example UE 104 of FIG. 1 and/or the UE 350 of FIG. 3. In some examples, each slot may include the same or similar time domain resources. For example, in 5G NR, repeated transmission of PUSCH over successive slots (e.g., via slot-repetition, aggregation, multiple-slot PUSCH) may be supported to, for example, increase the SNR for transmission reliability. For example, the MCS and resource allocation may be indicated in scheduling DCI, and may be common over the successive slots. Further, the number of slots may be radio resource control (RRC) configured (e.g., 2 slots, 4 slots, or 8 slots), and may be common for each scheduling (e.g., there may be no distinction between a new transmission or a retransmission).

For each slot of the multiple-slot PUSCH 400, the transmission block (TB) may be the same, but the encoded bits may differ such that a redundancy value (RV) of each slot is different. For example, the RV of a first slot may be indicated in the scheduling DCI, while the RV of another slot (n) may be determined by "n mod 4." In the illustrated example of FIG. 4, an example RV over slots for a new transmission of a 4-slot PDSCH may include RV0, RV2, RV3, and RV1. Another example RV over slots of a new retransmission of a 4-slot PDSCH may include RV3, RV1, RV0, and RV2. Further, a PUSCH repetition may be applied to coverage limited scenarios.

The example multiple-slot PUSCH 400 includes a 4-slot PUSCH 410. In the illustrated example of FIG. 4, the 4-slot PUSCH 410 is implemented via a single slot TTI. However, other examples may include, for example, a 4-slot TTI or a 2-slot TTI. For multiple-slot PUSCH with TBS scaling-up or MCS scaling-up by an integer (e.g., 2 or 4), the transmission performance may be similar to multiple-slot TTI (sometimes referred to as a "super-slot").

In some examples, the transport block size (TBS) may be determined with PUSCH resources of a single slot, even for multiple-slot PUSCH (e.g., PUSCH repetition). For example, the TBS may be determined based on a first slot 412 of FIG. 4. Additionally, a code rate (R) and a modulation order ($Q_m$) indicated by the MCS may be used to determine the TB size for a transmission. For example, Equation 1 (below) may be used to determine the TB size for a transmission.

$$TBS + L_{CRC} \approx N_{RE} * R * Q_m \qquad \text{Equation 1:}$$

In Equation 1, the parameter "TBS" refers to the TB size of a transmission, the parameter "$L_{CRC}$" refers to a number of cyclic redundancy check (CRC) bits, the parameter "$N_{RE}$" refers to a total number of data REs of PUSCH in a single slot (e.g., the slot 412), the parameter "R" refers to the code rate indicated by the MCS associated with the slot 412, and the parameter "$Q_m$" refers to the modulation order indicated by the MCS associated with the slot 412. However, such a calculation for TBS may result in a very low effective code rate for a multiple-slot PUSCH ($R_{eff,multi-slot}$). In some examples, Equation 2 (below) may be used to determine the effective code rate for a multiple-slot PUSCH.

$$R_{eff,mult-slot} = R/M \qquad \text{Equation 2:}$$

In Equation 2, the term "$R_{eff,multi-slot}$" refers to the effective code rate for a multiple-slot PUSCH, the term "R" refers to the code rate, and the term "M" refers to the number of slots.

However, for uplink coverage limited scenarios the transmission power of the UE may be a cause of a bottleneck. Additionally, further lowering down of an already-low effective code rate may be harmful to the transmission reliability, and may also cost more resources and/or bandwidth. For example, doubling the bandwidth may be associated with half the effective code rate ($R_{eff}/2$) and lowers the power spectrum density (PSD) by 3 decibels (dB) for an uplink transmission with limited power. Thus, the SNR may be lowered by the 3 dB. However, although the combined gain of the halved effective code rate ($R_{eff}/2$) can be assumed to be 3 dB, the channel estimation loss due to the lower SNR may result in a gain of less than 3 dB and may not compensate for the SNR loss. Thus, it may be beneficial to determine the TB size by PUSCH resource over multiple slots (sometimes referred to as "TBS scaling").

In some examples, the TB size may be determined by first calculating a per-PRB and per-slot number of data REs ($N_{RE}'$). For example, Equation 3 (below) may be used to calculate the per-PRB and per-slot number of data REs ($N_{RE}'$).

$$N_{RE}' = 12 * N_{symb}^{sh} - N_{DMRS}^{PRB} - N_{oh}^{PRB} \qquad \text{Equation 3:}$$

In Equation 3, the parameter "$N_{symb}^{sh}$" refers to the number of symbols, the parameter "$N_{DMRS}^{PRB}$" refers to the number of DMRS REs, and the parameter "$N_{oh}^{PRB}$" refers to a semi-static overhead. The semi-static overhead "$N_{oh}^{PRB}$" may be caused by, for example, broadcast information. In the example Equation 3, the number of symbols "$N_{symb}^{sh}$" is multiplied by the term "12" because there are 12 REs per PRB.

After the per-PRB and per-slot number of data REs ($N_{RE}'$) is calculated, the total number of REs ($N_{RE}$) may be calculated using Equation 4 (below).

$$N_{RE} = \min(156, N_{RE}') * n_{PRB} \qquad \text{Equation 4:}$$

In Equation 4, the parameter "$N_{RE}'$" refers to the per-PRB and per-slot number of data REs, and the term "$n_{PRB}$" refers to the total number of PRBs. As shown in Equation 4, the total number of REs ($N_{RE}$) may be calculated by multiplying the total number of PRBs ($n_{PRB}$) by a minimum of the value "156" and the per-PRB and per-slot number of data REs ($N_{RE}'$). Thus, the total number of REs ($N_{RE}$) refers to the total number of REs per slot.

The total number of REs ($N_{RE}$) may be used to calculate an intermediate value ($N_{info}$). For example, Equation 5 (below) may be used to calculate the intermediate value ($N_{info}$).

$$N_{info} = N_{RE} * R * Q_m * v \qquad \text{Equation 5:}$$

In Equation 5, the term "$N_{RE}$" refers to the total number of REs, the term "R" refers to the code rate associated with an indicated MCS, the term "$Q_m$" refers to the modulation order associated with the indicated MCS, and the term "$vN_{RE}$" refers to a total number of MIMO layers.

In some examples, the intermediate value ($N_{info}$) may not be an integer. Thus, the term "TBS+$N_{info}$" may be used as a quantized value of the intermediate value ($N_{info}$). In some such examples, the TB size may be an integer multiple of the term "8."

For some types of downlink transmissions (e.g., a broadcast PDSCH, such as a paging transmission, a Msg2 transmission associated with a 4-step random access procedure, or a MsgB transmission associated with a 2-step random access procedure), a scaling factor (S) may be indicated in scheduling DCI. In some such examples, the scaling factor (S) may be less than one (S<1) and may be used to adjust the TB size. For example, for a downlink transmission, the transmission power may not be a concern and, thus, TBS scaling for a downlink transmission may correspond to scaling-down. That is, a lower coding rate will correspond to an increased transmission reliability. For example, Equation 6 (below) may be used to perform TBS scaling for a downlink transmission.

$$N_{info}=S*N_{RE}*R*Q_m*v \qquad \text{Equation 6:}$$

In Equation 6, the term "S" refers to the scaling factor for TBS scaling for a downlink transmission, the term "$N_{RE}$" refers to the total number of REs, the term "R" refers to the code rate associated with an indicated MCS, the term "$Q_m$" refers to the modulation order associated with the indicated MCS, and the term "$vN_{info}$" refers to a total number of MIMO layers. Based on Equation 6, the TB size may be adjusted by scaling-down the intermediate value ($N_{info}$) by the scaling factor (S).

Table 1 below illustrates example TBS scaling field values that map to corresponding scaling factor (S) values. The TBS scaling field value may be indicated via scheduling DCI.

TABLE 1

| TBS Scaling Field | Scaling Factor (S) |
|---|---|
| 00 | 1 |
| 01 | 0.5 |
| 10 | 0.25 |
| 11 | N/A |

In some examples, an uplink scaling factor (M) may may be indicated in scheduling DCI. In some such examples, the uplink scaling factor (M) may be greater than one (M>1) and may be used to adjust the TB size to scale-up for PUSCH. For example, Equation 7 (below) may be used to perform TBS scaling for a PUSCH transmission.

$$N_{info}=M*N_{RE}*R*Q_m*v \qquad \text{Equation 7:}$$

In Equation 7, the term "M" refers to the uplink scaling factor for TBS scaling for a PUSCH transmission, the term "$N_{RE}$" refers to the total number of REs, the term "R" refers to the code rate associated with an indicated MCS, the term "$Q_m$" refers to the modulation order associated with the indicated MCS, and the term "v" refers to a total number of MIMO layers. Based on Equation 7, the TB size may be adjusted by scaling-up the intermediate value ($N_{info}$) by the scaling factor (M).

Table 2 below illustrates example TBS scaling field values that map to corresponding uplink scaling factor (M) values. The TBS scaling field value may be indicated via scheduling DCI.

TABLE 2

| TBS Scaling Field | Uplink Scaling Factor (M) |
|---|---|
| 00 | 1 |
| 01 | 2 |
| 10 | 4 |
| 11 | 8 |

Although the example Table 1 and Table 2 provide certain mappings between the TBS scaling field values and scaling factors (S, M) values, respectively, the examples are merely illustrative. That is, other examples may include additional or alternative mappings between TBS scaling field values and scaling factors.

Figure 5:
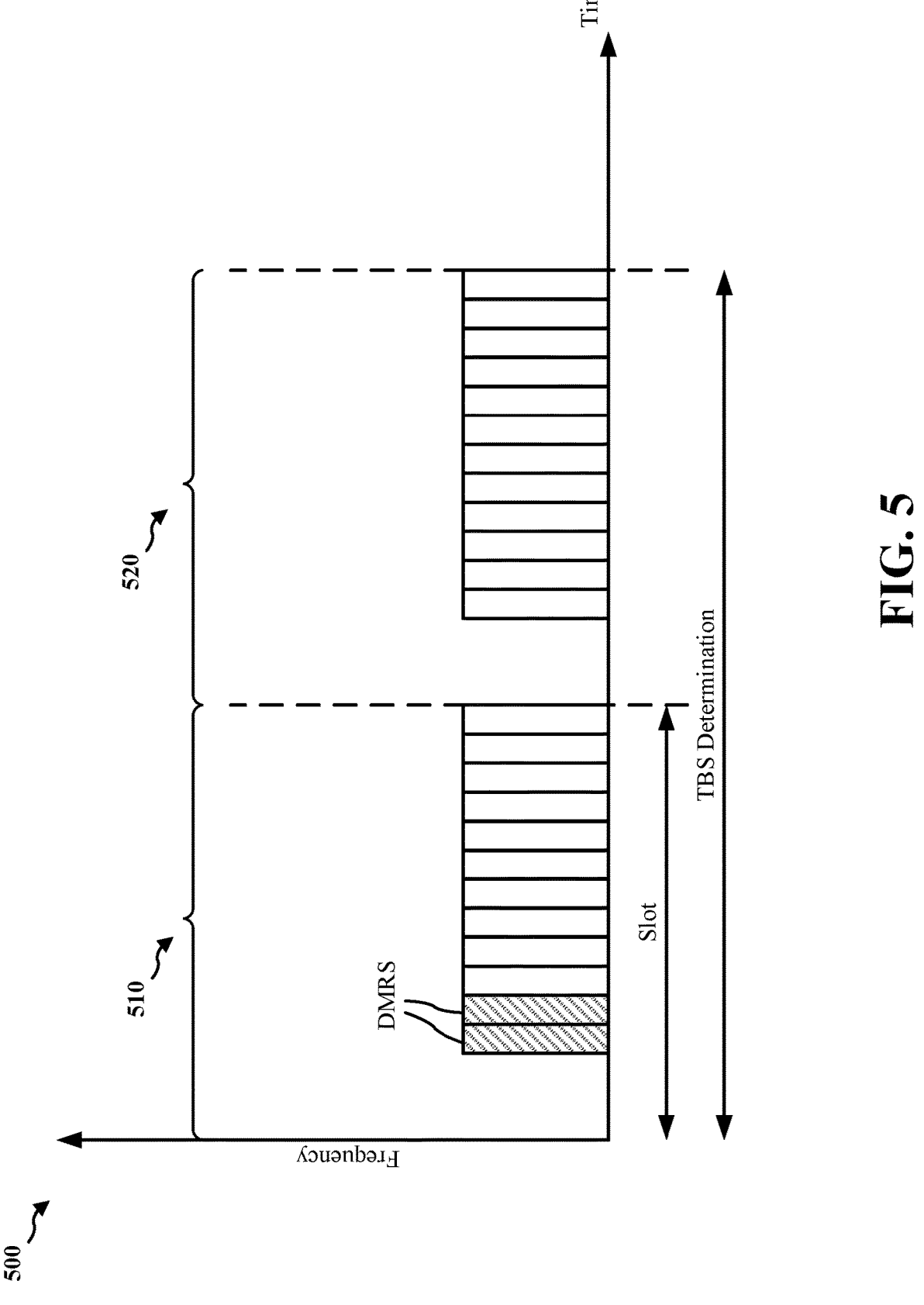
FIG. 5 illustrates an example timing diagram including a first slot and a second slot, in accordance with the teachings disclosed herein.

As described above, the TB size determination may be based on the number of data REs in a slot. However, in some examples, the number of DMRS over slots may be different (e.g. a non-uniform distribution of DMRS over slots) and thus, a different number of data REs may be associated with each slot. FIG. 5 illustrates an example timing diagram 500 including a first slot 510 and a second slot 520. As shown in FIG. 5, the first slot 510 includes two DMRS REs and the second slot 520 includes zero DMRS REs. However, it may be appreciated that in other examples, the quantity of DMRS REs included in the second slot 520 may be greater than or equal to the quantity of DMRS REs included in the first slot 510.

Since the number of data REs may be different in each slot (e.g., the number of data REs in the first slot 510 is different than the number of data REs in the second slot 520), performing TBS scaling using the uplink scaling factor (M) may be inappropriate.

Example techniques disclosed herein facilitate performing TBS determination for non-uniform DMRS distributions. For example, the UE may determine a per-PRB and per-M-single repetitions number of data REs ($N_{RE}"$) may be associated with a duration longer than 14 symbols. Additionally, in some examples, a different overhead ($N_{oh}^{PRB}$) may be configured for the UE to apply to determine the TBS for a set of PUSCH repetitions than for a single repetition. It may be appreciated that the term "single repetition" may apply to repetition Type A and/or repetition Type B. When referring to repetition Type A, the UE may transmit PUSCH transmissions using back-to-back (e.g., consecutive) symbols in one or more repetitions using consecutive available slots (e.g., M symbols). When referring to repetition Type B, the UE may transmit PUSCH transmissions using back-to-back (e.g., consecutive) symbols across slots (e.g., M nominal repetitions).

Figures 6A, 6B:
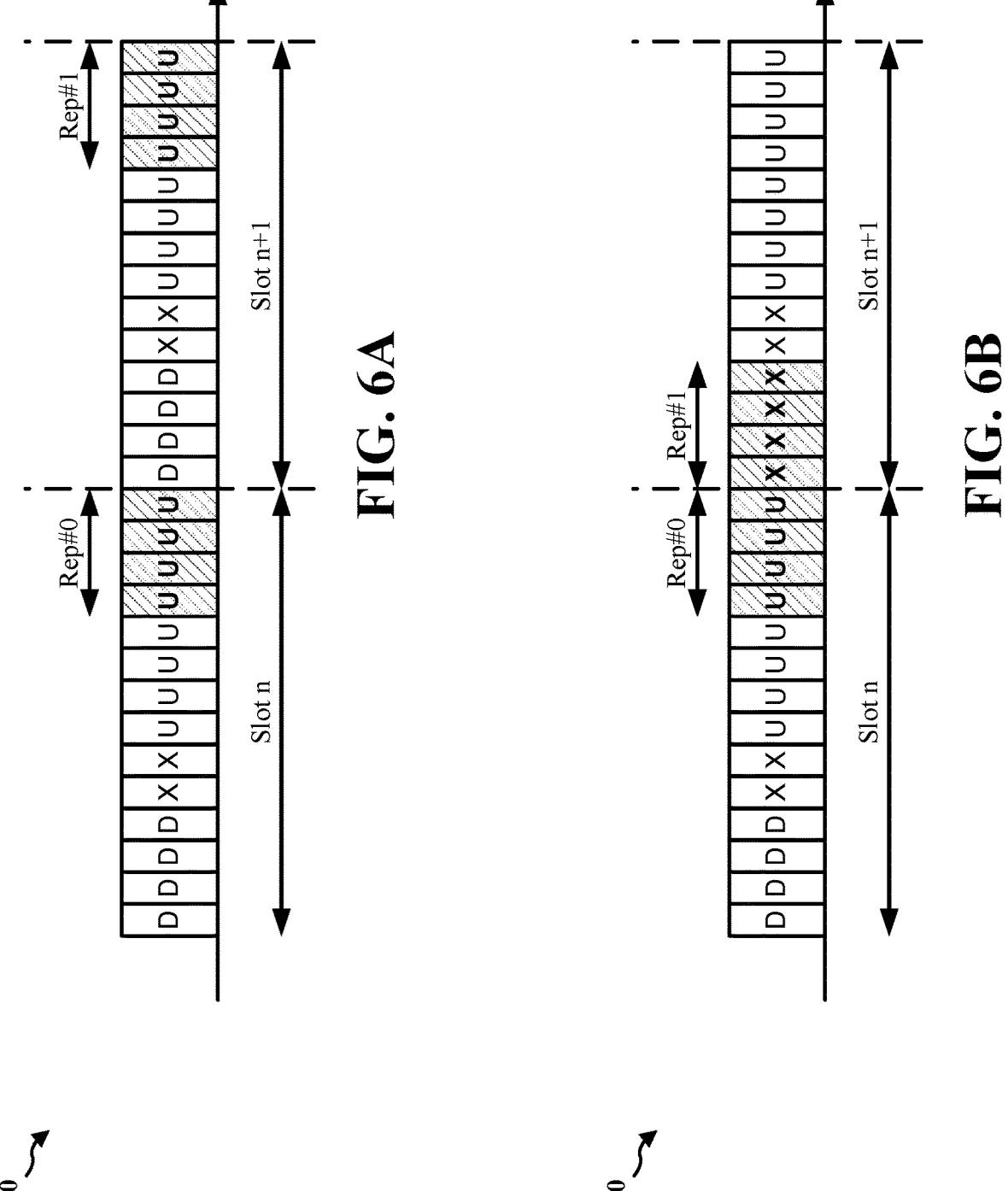
FIG. 6A illustrates an example multiple-slot PUSCH including PUSCH repetition Type A, in accordance with the teachings disclosed herein.
FIG. 6B illustrates an example multiple-slot PUSCH including PUSCH repetition Type B, in accordance with the teachings disclosed herein.

FIG. 6A illustrates an example multiple-slot PUSCH 600 including PUSCH repetition Type A. In the illustrated example of FIG. 6A, a first repetition (Rep #0) is configured for the last four symbols of a first slot n and a second repetition (Rep #1) is configured for the last four symbols a second slot n+1. As shown in FIG. 6A, a large time gap may occur between repetitions (e.g., due to the symbols between the end of the first repetition (Rep #0) and the start of the second repetition (Rep #1).

FIG. 6B illustrates an example multiple-slot PUSCH 650 including PUSCH repetition Type B. In the illustrated example of FIG. 6B, a first repetition (Rep #0) is configured for the last four symbols of a first slot n and a second repetition (Rep #1) is configured for the first four symbols of a second slot n+1. As shown in FIG. 6B, the repetitions are configured to eliminate the time gap between the repetitions and ensure the configured number of repetitions in a time constraint because the repetitions are carried out in the consecutive mini-slots so one slot might contain more than one repetition of a transport block. The number of nominal repetitions (K) in the example of FIG. 6B (e.g., K=2) may be indicated using DCI. Additionally, the time-domain resource allocation (TDRA) of the first nominal repetition may be indicated in DCI as starting symbols (S) and symbol length (L) (e.g., S=10 and L=4). A nominal repetition may be segmented into multiple actual repetitions based on conditions, such as around a slot boundary, around a semi-static configured downlink (D) or invalid symbol. The redundancy value (RV) of the n-th actual repetition may be determined by "n mod 4." In some examples, TBS may be determined by the first nominal transmission based on a nominal symbol length (L).

As described above, after the UE calculates the per-PRB and per-single repetition number of data REs ($N_{RE}''$), the UE may calculate the total number of REs ($N_{RE}$). For example, the UE may use Equation 8 (below) to calculate the number of REs ($N_{RE}$) allocated to the PUSCH.

$$N_{RE} = \min(156*M, N_{RE}'')*n_{PRB} \qquad \text{Equation 8:}$$

In Equation 8, the parameter "M" refers to slots for PUSCH repetition Type A or nominal repetitions for PUSCH repetition Type B, the parameter "$N_{RE}''$" refers to the per-PRB and per-M-single repetition (e.g., per-M-slot for PUSCH repetition Type A or per-M-nominal repetition for PUSCH repetition Type B) number of data REs, and the term "$n_{PRB}$" refers to the total number of PRBs. As shown in Equation 8, the total number of REs ($N_{RE}$) may be calculated by multiplying the total number of PRBs ($n_{PRB}$) by a minimum of the value "156*M" and the per-PRB and per-M-single repetition number of data REs ($N_{RE}''$). Thus, the total number of REs ($N_{RE}$) refers to the total number of REs per slot. In the example Equations 4 and 8 (above), the value "156" refers to a largest average number of REs per-slot and per-PRB. However, other examples may include alternate values. With respect to Equations 4 and 8 (above), the Equation 4 applies to single-slot and Equation 8 applies to multiple-slot.

Thus, a UE may determine a TBS of a PUSCH transmission based at least in part on a set of PUSCH resources corresponding to a set of PUSCH repetitions for transmission over a repetition unit comprising a plurality of single repetitions (e.g., a plurality of slots when applying PUSCH repetition Type A or a plurality of nominal repetitions when applying PUSCH repetition Type B). The TBS may be based on different numbers of data REs in different slots of the plurality of slots or nominal repetitions. In some examples, the UE may transmit the PUSCH repetition with the TBS determined over the repetition unit comprising the plurality of single repetitions. In some examples, the UE applies a different overhead configuration to determine the TBS for the set of PUSCH repetitions than for a single PUSCH repetition. In some examples, the UE may determine the TBS based on a total number of resource elements ($N_{RE}$) based on a largest average number of REs per slot. In some examples, the UE may determine the total number of REs ($N_{RE}$) based on a minimum of the largest average number of REs per slot multiplied by a number of the plurality of single repetitions, and a number of per-PRB REs over the plurality of single repetitions ($N_{RE}''$). In some examples, the number of per PRB REs may be greater than 14 symbols. In some examples, the PUSCH repetitions with the determined TBS may be based on at least one of a maximum number of PRBs, a maximum number of slots, a maximum number of symbols, and/or a maximum modulation order (e.g., QPSK).

In some examples, the uplink scaling factor (M) may be dynamically indicated, for example, by a base station. Example techniques disclosed herein facilitate DCI indication of TBS scaling for multiple-slot PUSCH via a TDRA field of a scheduling DCI. For example, the TDRA field may comprise a PUSCH list for multiple PUSCH transmissions. In some examples, the PUSCH list may comprise a tuple including one or more of a PDCCH to PUSCH slot offset (k2), a mapping type, a starting symbol (S), a symbol length (L), and/or a number of single repetitions (e.g., M slots for PUSCH repetition Type A or M nominal repetitions for PUSCH repetition Type B).

Thus, a UE may implement dynamic indication of M by receiving scheduling DCI indicating, in a TDRA field, a scaling parameter (M) for a TBS of a PUSCH transmission for transmission as PUSCH repetitions over a repetition unit comprising a plurality of single repetitions (e.g., M slots for PUSCH repetition Type A or M nominal repetitions for PUSCH repetition Type B). The UE may also transmit the PUSCH repetitions with scaling based on the scaling parameter indicated in the scheduling DCI. In some examples, the TDRA field comprises a PUSCH list for multiple PUSCH transmissions. In some examples, the PUSCH list may include a number of slots for TBS determination for each of the multiple PUSCH transmissions. In some examples, the PUSCH list may further include one or more of a PDCCH-to-PUSCH slot offset (k2), a mapping type, a starting symbol, a symbol length, and/or a number of nominal repetitions for repetition. In some examples, the starting symbol and the symbol length may be provided via different (e.g., separate) parameters in the PUSCH list. In some examples, the PUSCH list may include a number of slots when the TDRA field applies to PUSCH repetition Type A. In some examples, the PUSCH list may a number of slots for repetition (N) or a number of slots for TBS determination (M) when the TDRA field applies to PUSCH repetition Type B.

In some examples, the scaling parameter may apply to PUSCH repetition type A having slots for the PUSCH repetitions. In some examples, the scaling parameter may apply to PUSCH repetition type B having consecutive symbols for the PUSCH repetitions. In some examples, the TBS of the PUSCH transmission may be based on at least one of a maximum number of PRBs, a maximum number of slots, a maximum number of symbols, and/or a maximum modulation order (e.g., QPSK).

It may be appreciated that TBS scaling-up may increase use of processing resources at the base station (e.g., for receiving the PUSCH transmission) and the UE (e.g., for transmitting the PUSCH transmission). Accordingly, example techniques disclosed herein provide limitations for when TBS scaling over multiple-slot PUSCH may be applied. For example, disclosed techniques may determine the TBS of the PUSCH transmission based on at one of a maximum number of PRBs, a maximum number of slots, a maximum number of symbols, and/or a maximum modulation order (e.g., QPSK).

In some examples, UCI multiplexing on PUSCH may be implemented when there is a partial overlap of a PUSCH with a PUCCH. Other examples include directly scheduling an aperiodic CSI report on PUSCH where the UCI may not be associated with a PUCCH. That is, aperiodic CSI reports may be triggered on a multiple-slot PUSCH, where the UCI may be multiplexed on a first slot transmission of the multiple-slot PUSCH. Hence, in some examples, the aperiodic CSI may be multiplexed on a first slot of the PUSCH.

In some examples, the aperiodic CSI may be repeated over N slots, where the parameter "N" refers to the number of repetitions.

However, when performing TBS scaling-up of PUSCH transmissions over M single repetitions and where the number of single repetitions (M) is less than or equal to the number of repetitions (N) (e.g., N>M), example techniques may transmit the aperiodic CSI on the first M single repetitions. In some examples, the aperiodic CSI may be spread over the first M single repetitions of the N repetitions. In some examples, the aperiodic CSI may be repeated M times over the first M single repetitions of the N repetitions.

Thus, a UE may determine a TBS of a PUSCH transmission based at least in part on a set of PUSCH resources corresponding to a set of PUSCH repetitions for transmission over a repetition unit comprising a plurality of single repetitions (e.g., a plurality of slots when the UE applies PUSCH repetition Type A or a plurality of nominal repetitions when the UE applies PUSCH repetition Type B). The UE may also multiplex UCI with multiple repetitions of the PUSCH transmission for transmission as PUSCH repetitions over the repetition unit comprising the plurality of single repetitions (M). Additionally, the UE may transmit the PUSCH repetitions with the UCI multiplexed over the multiple repetitions.

In some examples, the UCI may comprise aperiodic CSI. In some examples, the UE may spread the UCI over the plurality of single repetitions (M) beginning with a first repetition of the multiple repetitions (N). In some examples, the UE may repeat the UCI in each of the plurality of single repetitions (M) beginning with a first repetition of the multiple repetitions (N).

Figure 7:
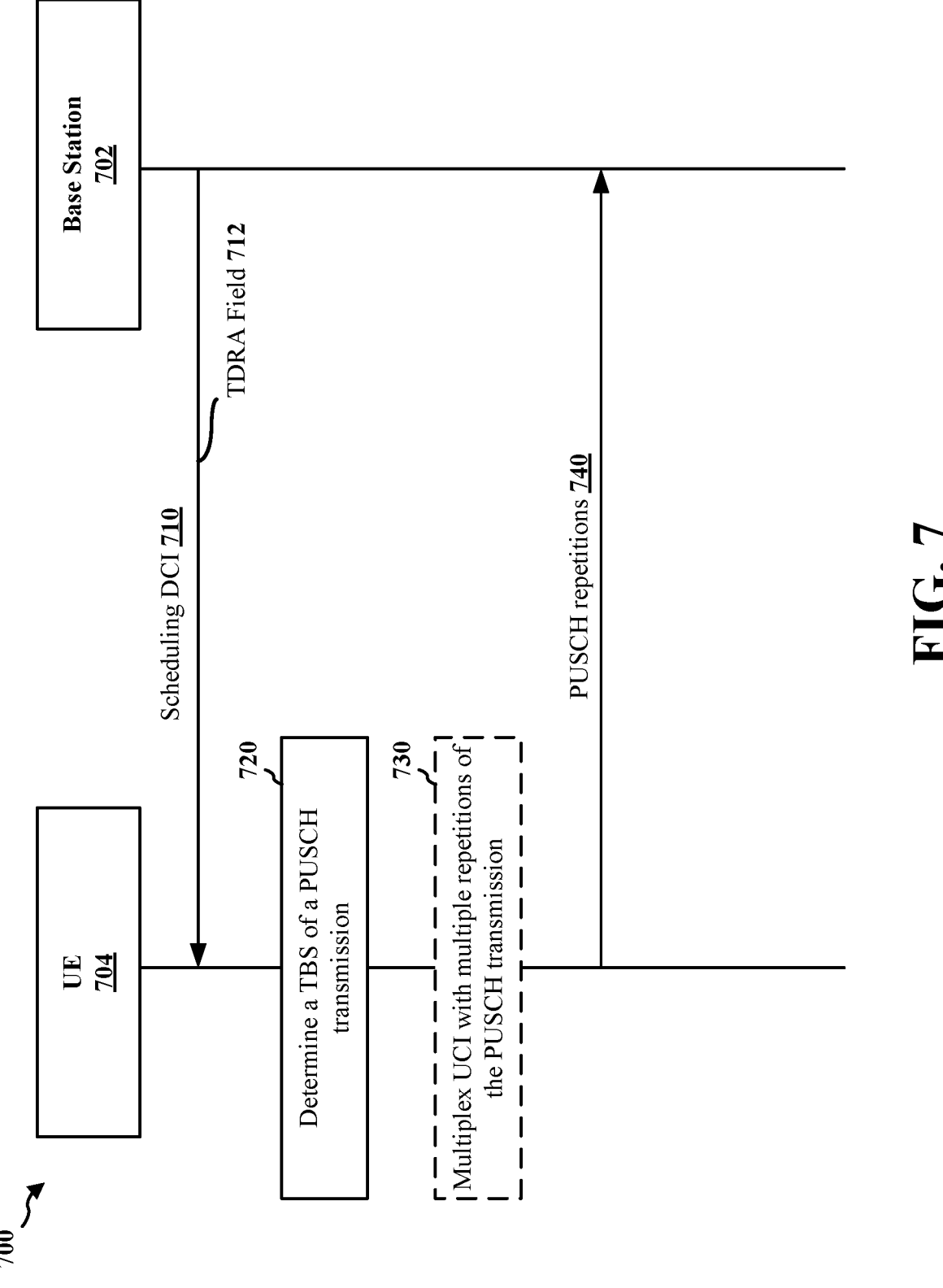
FIG. 7 is an example communication flow between a base station and a UE, in accordance with the teachings disclosed herein.

FIG. 7 illustrates an example communication flow 700 between a base station 702 and a UE 704, as presented herein. In the illustrated example, the communication flow 700 facilitates the UE 704 improving uplink data channel (PUSCH) repetitions using multiple slot transmit time intervals. Aspects of the base station 702 may be implemented by the base station 102/180 of FIG. 1, the base station 310 of FIG. 3, the base station 402 of FIG. 4, and/or the base station 502 of FIG. 5. Aspects of the UE 704 may be implemented by the UE 104 of FIG. 1, the UE 350 of FIG. 3, the UE 404 of FIG. 4, the UE 504 of FIG. 5, and/or the UE 604 of FIG. 6. Although not shown in the illustrated example of FIG. 7, it may be appreciated that in additional or alternative examples, the base station 702 may be in communication with one or more other base stations or UEs, and/or the UE 704 may be in communication with one or more other base stations or UEs.

In the illustrated example, the base station 702 transmits a scheduling DCI 710 that may be received by the UE 704.

At 720, the UE 704 may determine a TBS of a PUSCH transmission. In some examples, the UE 704 may determine, at 720, the TBS of the PUSCH transmission based on at least one of a maximum number of PRBs, a maximum number of slots, a maximum number of symbols, and/or a maximum modulation order (e.g., QPSK).

The ULE 704 transmits PUSCH repetitions 740 that may be received by the base station 702.

In some examples, the scheduling DCI 710 may indicate scaling parameter for a TBS of the PUSCH transmission for transmission as the PUSCH repetitions 740 over a repetition unit comprising a plurality of single repetitions (e.g., M slots when applying PUSCH repetition Type A or M nominal repetitions when applying PUSCH repetition Type B). The scheduling DCI 710 may indicate the scaling parameter (M) using a TDRA field 712. In some examples, the TDRA field 712 may comprise a PUSCH list for multiple PUSCH transmissions. In some examples, the PUSCH list may include a number of slots for TBS determination for each of the multiple PUSCH transmissions. In some examples, the PUSCH list may further include one or more of a PDCCH-to-PUSCH slot offset (k2), a mapping type, a starting symbol, a symbol length, and/or a number of nominal repetitions for repetition. In some examples, the starting symbol and the symbol length may be provided via different (e.g., separate) parameters in the PUSCH list. In some examples, the PUSCH list may include a number of slots when the TDRA field 712 applies to PUSCH repetition Type A. In some examples, the PUSCH list may a number of slots for repetition or a number of slots for TBS determination when the TDRA field 712 applies to PUSCH repetition Type B.

In some examples, the scaling parameter (M) may apply to PUSCH repetition type A having slots for the PUSCH repetitions. In some examples, the scaling parameter (M) may apply to PUSCH repetition type B having consecutive symbols for the PUSCH repetitions.

In some examples, the UE 704 may determine, at 720, the TBS based on the scaling parameter (M) (e.g., received via the scheduling DCI 710). The PUSCH repetitions 740 may comprise scaling based on the scaling parameter (M) indicated in the scheduling DCI 710.

In some examples, the UE 704 may determine, at 720, the TBS based at least in part on a set of PUSCH resources corresponding to a set of PUSCH repetitions for transmission over a repetition unit comprising a plurality of repetitions. For example, the TBS may be based on different numbers of data REs in different slots of the plurality of single repetitions (e.g., the plurality of slots or the plurality of nominal repetitions). In some examples, the UE 704 may apply a different overhead configuration to determine the TBS for the set of PUSCH repetitions than for a single PUSCH repetition. In some examples, the UE 704 may determine the TBS based on a total number of resource elements ($N_{RE}$) based on a largest average number of REs per slot. In some examples, the UE 704 may determine the total number of REs ($N_{RE}$) based on a minimum of the largest average number of REs per slot multiplied by a number of the plurality of single repetitions, and a number of per-PRB REs over the plurality of single repetitions ($N_{RE}''$). In some examples, the number of per PRB REs may be greater than 14 symbols. In some examples, the UE 704 may transmit the PUSCH repetition 740 with the TBS determined over the repetition unit comprising the plurality of single repetitions.

In some examples, the UE 704 may multiplex, at 730, UCI with multiple repetitions of the PUSCH transmission. For example, the UE 704 may multiplex UCI with multiple repetitions of the PUSCH transmission for transmission as PUSCH repetitions over a repetition unit comprising a plurality of single repetitions (M). Additionally, the UE 704 may transmit the PUSCH repetitions 740 with the UCI multiplexed over the multiple repetitions (N).

In some examples, the UCI may comprise aperiodic CSI. In some examples, the UE 704 may spread the UCI over the plurality of single repetitions (M) beginning with a first repetition of the multiple repetitions (N). In some examples, the UE 704 may repeat the UCI in each of the plurality of single repetitions (M) beginning with a first repetition of the multiple repetitions (N).

FIGS. 8 to 10 are flowcharts of methods of wireless communication. The methods of FIGS. 8 to 10 may be performed by a UE (e.g., the UE 104; the apparatus 1102).

Optional aspects are illustrated with a dashed line. The methods of FIGS. 8 to 10 may facilitate improving use of uplink data channel (PUSCH) repetitions using multiple-slot TTIs.

FIG. 8 is a flowchart 800 of a method of wireless communication employing a dynamic indication of a plurality of slots (M).

At 802, the UE receives scheduling DCI indicating a scaling parameter for a TBS of a PUSCH transmission for transmissions as PUSCH repetitions over a repetition unit comprising a plurality of single repetitions, as described in connection with the scheduling DCI 710 of FIG. 7. For example, the receiving of the scheduling DCI may be performed by a scheduling DCI component 1140 of the apparatus 1102 of FIG. 11. The single repetitions may correspond to a plurality of slots (e.g., M slots) when applying PUSCH repetition Type A or may correspond to a plurality of nominal repetitions (e.g., M nominal repetitions) when applying PUSCH repetition Type B.

The scheduling DCI may indicate the scaling parameter in a TDRA field, as described in connection with the TDRA field 712 of FIG. 7. In some examples, the TDRA field may comprise a PUSCH list for multiple PUSCH transmissions. In some examples, the PUSCH list may include a number of slots for TBS determination for each of the multiple PUSCH transmissions. The PUSCH list may further include one or more of a PDCCH-to-PUSCH slot offset (k2), a mapping type, a starting symbol, a symbol length, and/or a number of single repetitions (e.g. a number of slots or a number of nominal repetitions) for repetition.

In some examples, the scaling parameter (M) may apply to PUSCH repetition Type A having slots for the PUSCH repetitions, as described in connection with FIG. 6A. In some examples, the scaling parameter (M) may apply to PUSCH repetition Type B having consecutive symbols for the PUSCH repetitions, as described in connection with FIG. 6B.

At 804, the UE transmits the PUSCH repetitions with scaling based on the scaling parameter indicated in the scheduling DCI, as described in connection with the PUSCH repetitions 740 of FIG. 7. For example, the transmitting of the PUSCH repetitions with scaling based on the scaling parameter indicated in the scheduling DCI may be performed by a scaling parameter transmissions component 1142 of the apparatus 1102 of FIG. 11. In some examples, the TBS of the PUSCH transmissions may be based on at least one of a maximum number of PRBs, a maximum number of slots, a maximum number of symbols, or a maximum modulation order.

FIG. 9 is a flowchart 900 of a method of wireless communication employing TBS determination for non-uniform DMRS, as described in connection with FIG. 5.

At 902, the UE determines a TBS of a PUSCH transmission based at least in part on a set of PUSCH resources corresponding to a set of PUSCH repetitions for transmission over a repetition unit comprising a plurality of single repetitions, as described in connection with 720 of FIG. 7. For example, the determining of the TBS of the PUSCH transmission based at least in part on the set of PUSCH resources corresponding to the set of PUSCH repetitions for transmission over the repetition unit comprising a plurality of single repetitions may be performed by a TBS determination component 1144 of the apparatus 1102 of FIG. 11.

In some examples, the UE may determine the TBS based on a different quantity of data REs associated with different slots, such as described in connection with FIG. 5. In some examples, the UE may apply a different overhead configuration ($N_{oh}^{PRB}$) to determine the TBS for the set of PUSCH repetitions than for a single PUSCH transmission. In some examples, the UE may determine the TBS based on a total number of REs ($N_{RE}$) based on a largest average number of REs per slot. In some examples, the UE may determine the total number of REs ($N_{RE}$) based on a minimum of (1) the largest average number of REs per slot multiplied by a number of the plurality of single repetitions, and (2) a number of per-PRB REs over the plurality of single repetitions ($N_{RE}''$). In some examples, the number of per-PRB REs may be greater than 14 symbols.

At 904, the UE transmits the PUSCH repetitions with the TBS determined over the repetition unit comprising the plurality of single repetitions, as described in connection with the PUSCH repetitions 740 of FIG. 7. For example, the transmitting of the PUSCH repetitions with the TBS determined over the repetition unit comprising the plurality of single repetitions may be performed by an overhead symbols transmissions component 1146 of the apparatus 1102 of FIG. 11. In some examples, the PUSCH transmissions with the determined TBS may be based on at least one of a maximum number of PRBs, a maximum number of slots, a maximum number of symbols, or a maximum modulation order.

FIG. 10 is a flowchart 1000 of a method of wireless communication employing multiplexing of UCI.

At 1002, the UE determines a TBS of a PUSCH transmission based at least in part on a set of PUSCH resources corresponding to a set of PUSCH repetitions for transmission over a repetition unit comprising a plurality of single repetitions, as described in connection with 720 of FIG. 7. For example, the determining of the TBS of the PUSCH transmission based at least in part on the set of PUSCH resources corresponding to the set of PUSCH repetitions for transmission over the repetition unit comprising a plurality of single repetitions may be performed by a TBS determination component 1144 of the apparatus 1102 of FIG. 11.

At 1004, the UE multiplexes UCI with multiple repetitions of the PUSCH transmission for transmission as PUSCH repetitions over a repetition unit comprising a plurality of single repetitions, as described in connection with 730 of FIG. 7. For example, the multiplexing of the UCI with multiple repetitions of the PUSCH transmission for transmission as PUSCH repetitions over the repetition unit comprising a plurality of single repetitions may be performed by a UCI multiplexing component 1148 of the apparatus 1102 of FIG. 11.

In some examples, the UCI may include aperiodic CSI. In some examples, the UE may spread the UCI over the plurality of single repetitions (M) beginning with a first repetition of the multiple repetitions (N). In some examples, the UE may repeat the UCI in each of the plurality of single repetitions (M) beginning with a first repetition of the multiple repetitions (N).

At 1006, the UE transmits the PUSCH repetitions with the UCI multiplexed over the multiple repetitions, as described in connection with the PUSCH repetitions 740 of FIG. 7. For example, the transmitting of the PUSCH repetitions with the UCI multiplexed over the multiple repetitions may be performed by a multiplexed transmissions component 1150 of the apparatus 1102 of FIG. 11. In some examples, the PUSCH transmissions with the determined TBS may be based on at least one of a maximum number of PRBs, a maximum number of slots, a maximum number of symbols, or a maximum modulation order.

Figure 11:
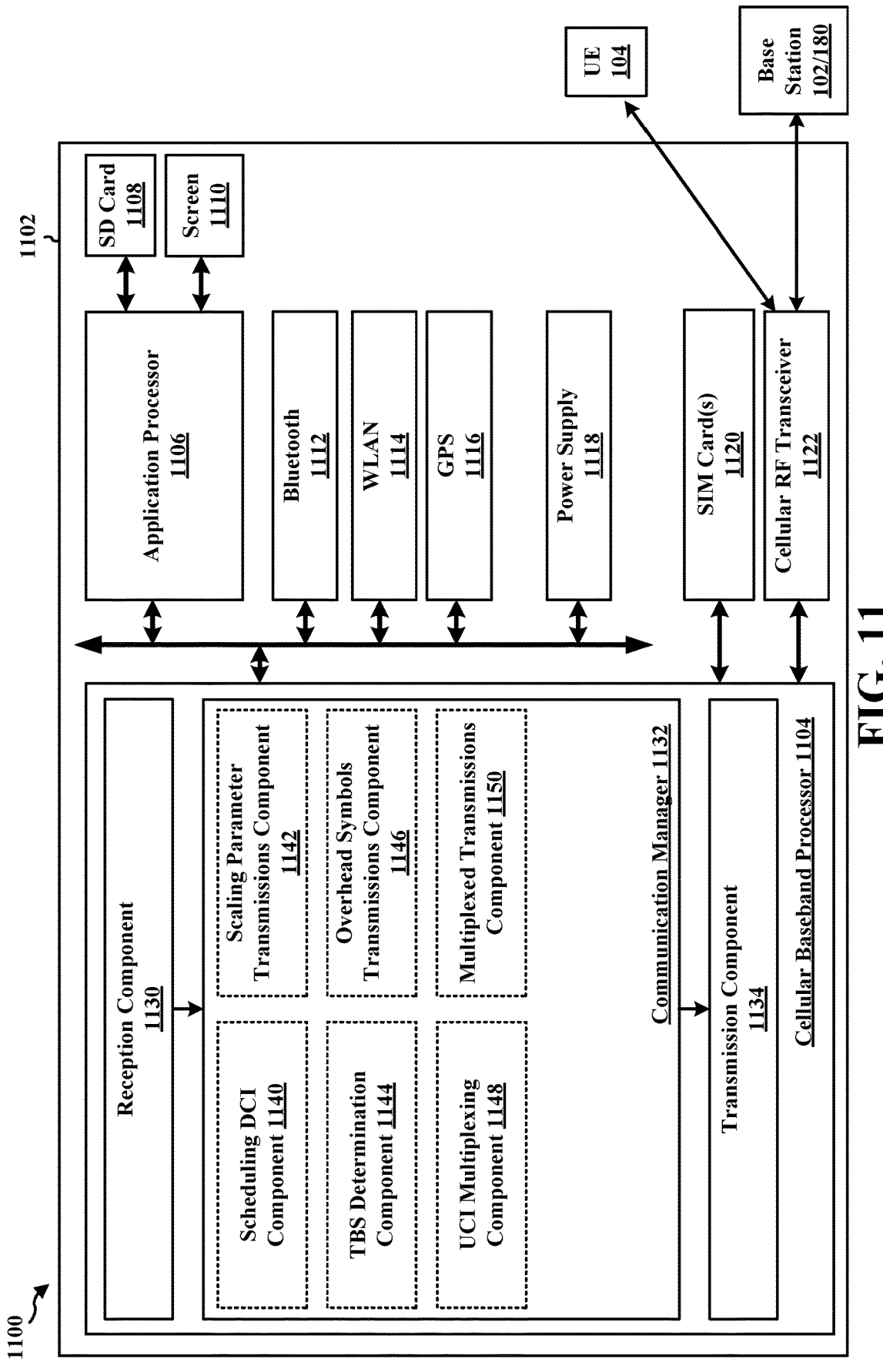
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see the UE 350 of FIG. 3) and include the aforediscussed additional modules of the apparatus 1102.

The communication manager 1132 includes a scheduling DCI component 1140 that is configured to receive the scheduling DCI, e.g., as described in connection with 802 of FIG. 8. The communication manager 1132 further includes a scaling parameter transmissions component 1142 that is configured to transmit the PUSCH repetitions with scaling based on the scaling parameter indicated in the scheduling DCI, e.g., as described in connection with 804 of FIG. 8. The communication manager 1132 further includes a TBS determination component 1144 that is configured to determine the TBS of the PUSCH transmission based at least in part on the set of PUSCH resources corresponding to the set of PUSCH repetitions for transmission over the repetition unit comprising a plurality of single repetitions, e.g., as described in connection with 902 of FIGS. 9 and/or 1002 of FIG. 10. The communication manager 1132 further includes an overhead symbols transmission component 1146 that is configured to transmit the PUSCH repetitions with the TBS determined over the repetition unit comprising the plurality of single repetitions, e.g., as described in connection with 904 of FIG. 9. The communication manager 1132 further includes a UCI multiplexing component 1148 that is configured to multiplex the UCI with multiple repetitions of the PUSCH transmission for transmission as PUSCH repetitions over the repetition unit comprising the plurality of single repetitions, e.g., as described in connection with 1004 of FIG. 10. The communication manager 1132 further includes a multiplexed transmissions component 1150 that is configured to transmit the PUSCH repetitions with the UCI multiplexed over the multiple repetitions, e.g., as described in connection with 1006 of FIG. 10.

The apparatus may include additional components that perform each of the blocks of the algorithm in the aforementioned flowcharts of FIGS. 8 to 10. As such, each block in the aforementioned flowcharts of FIGS. 8 to 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving scheduling downlink control information (DCI) indicating, in a time domain resource allocation (TDRA) field, a scaling parameter for a transport block size (TBS) of a physical uplink shared channel (PUSCH) transmission for transmission as PUSCH repetitions over a repetition unit comprising a plurality of single repetitions. The example apparatus 1102 also includes means for transmitting the PUSCH repetitions with scaling based on the scaling parameter indicated in the scheduling DCI.

In another configuration, the example apparatus 1102 includes means for determining a transport block size (TBS) of a physical uplink shared channel (PUSCH) transmission based at least in part on a set of PUSCH resources corresponding to a set of PUSCH repetitions for transmission over a repetition unit comprising a plurality of single repetitions. The example apparatus 1102 also includes means for transmitting the PUSCH repetitions with the TBS determined over the repetition unit comprising the plurality of single repetitions.

In another configuration, the example apparatus 1102 includes means for determining a transport block size (TBS) of a physical uplink shared channel (PUSCH) transmission based at least in part on a set of PUSCH resources corresponding to a set of PUSCH repetitions for transmission over a repetition unit comprising a plurality of single repetitions. The example apparatus 1102 also includes means for multiplexing uplink control information (UCI) with multiple repetitions of the PUSCH transmission for transmission as PUSCH repetitions over the repetition unit comprising the plurality of single repetitions. The example apparatus 1102 also includes means for transmitting the PUSCH repetitions with the UCI multiplexed over the multiple repetitions.

The aforementioned means may be one or more of the aforementioned components of the apparatus 1102 configured to perform the functions recited by the aforementioned means. As described supra, the apparatus 1102 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

The following examples are illustrative only and may be combined with aspects of other embodiments or teachings described herein, without limitation.

Example 1 is a method of wireless communication of a UE, comprising: receiving scheduling DCI indicating, in a TDRA field, a scaling parameter for a TBS of a PUSCH transmission for transmission as PUSCH repetitions over a repetition unit comprising a plurality of single repetitions; and transmitting the PUSCH repetitions with scaling based on the scaling parameter indicated in the scheduling DCI.

In Example 2, the method of Example 1 further includes that the TDRA field comprises a PUSCH list for multiple PUSCH transmissions, the PUSCH list including a number of slots for TBS determination for each of the multiple PUSCH transmissions.

In Example 3, the method of any of Example 1 or Example 2 further includes that the PUSCH list further comprises one or more of: a PDCCH to PUSCH slot offset, a mapping type, a starting symbol a symbol length, or a number of single repetitions for repetition.

In Example 4, the method of any of Examples 1 to 3 further includes that the scaling parameter applies to PUSCH repetition type having slots for the PUSCH repetitions.

In Example 5, the method of any of Examples 1 to 4 further includes that the scaling parameter applies to PUSCH repetition type having consecutive symbols for the PUSCH repetitions.

In Example 6, the method of any of Examples 1 to 5 further includes that the TBS of the PUSCH transmissions is based on at least one of a maximum number of PRBs, a maximum number of slots, a maximum number of symbols, or a maximum modulation order.

Example 7 is a device including one or more processors and one or more memories in electronic communication with the one or more processors storing instructions executable by the one or more processors to cause a system or an apparatus to implement a method as in any of Examples 1 to 6.

Example 8 is a system or apparatus including means for implementing a method or realizing an apparatus as in any of Examples 1 to 6.

Example 9 is a non-transitory computer-readable medium storing instructions executable by one or more processors to cause the one or more processors to implement a method as in any of Examples 1 to 6.

Example 10 is a method of wireless communication at a UE, comprising: determining a TBS of a PUSCH transmission based at least in part on a set of PUSCH resources corresponding to a set of PUSCH repetitions for transmission over a repetition unit comprising a plurality of single repetitions; and transmitting the PUSCH repetitions with the TBS determined over the repetition unit comprising the plurality of single repetitions.

In Example 11, the method of Example 10 further includes that the UE applies a different overhead configuration to determine the TBS for the set of PUSCH repetitions than for a single PUSCH transmission.

In Example 12, the method of any of Example 10 or Example 11 further includes that the UE determines the TBS based on a total number of resource elements ($N_{RE}$) based on a largest average number of REs per slot.

In Example 13, the method of any of Examples 10 to 12 further includes that the UE determines the $N_{RE}$ based on a minimum of: the largest average number of REs per slot multiplied by a number of the plurality of single repetitions, and a number of per PRB REs over the plurality of single repetitions ($N_{RE}''$).

In Example 14, the method of any of Examples 10 to 13 further includes that the number of per PRB REs is greater than 14 symbols.

In Example 15, the method of any of Examples 10 to 14 further includes that the PUSCH repetitions with the determined TBS is based on at least one of a maximum number of PRBs, a maximum number of slots, a maximum number of symbols, or a maximum modulation order.

Example 16 is a device including one or more processors and one or more memories in electronic communication with the one or more processors storing instructions executable by the one or more processors to cause a system or an apparatus to implement a method as in any of Examples 10 to 15.

Example 17 is a system or apparatus including means for implementing a method or realizing an apparatus as in any of Examples 10 to 15.

Example 18 is a non-transitory computer-readable medium storing instructions executable by one or more processors to cause the one or more processors to implement a method as in any of Examples 10 to 15.

Example 19 is a method of wireless communication at a UE, comprising: determining a TBS of a PUSCH transmission based at least in part on a set of PUSCH resources corresponding to a set of PUSCH repetitions for transmission over a repetition unit comprising a plurality of single repetitions; multiplexing UCI with multiple repetitions of the PUSCH transmission for transmission as PUSCH repetitions over the repetition unit comprising the plurality of single repetitions; and transmitting the PUSCH repetitions with the UCI multiplexed over the multiple repetitions.

In Example 20, the method of Example 19 further includes that the UCI comprises aperiodic CSI.

In Example 21, the method of any of Example 19 or Example 20 further includes that the UE spreads the UCI over the plurality of single repetitions beginning with a first repetition of the multiple repetitions.

In Example 22, the method of any of Examples 19 to 21 further includes that the UE repeats the UCI in each of the plurality of single repetitions beginning with a first repetition of the multiple repetitions.

Example 23 is a device including one or more processors and one or more memories in electronic communication with the one or more processors storing instructions executable by the one or more processors to cause a system or an apparatus to implement a method as in any of Examples 19 to 22.

Example 24 is a system or apparatus including means for implementing a method or realizing an apparatus as in any of Examples 19 to 22.

Example 25 is a non-transitory computer-readable medium storing instructions executable by one or more processors to cause the one or more processors to implement a method as in any of Examples 19 to 22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
  receiving scheduling downlink control information (DCI) indicating, in a time domain resource allocation (TDRA) field, a scaling parameter for a transport block size (TBS) of a physical uplink shared channel (PUSCH) transmission for transmission as PUSCH repetitions over a repetition unit comprising a plurality of single repetitions, wherein the scaling parameter for the TBS of the PUSCH transmission indicates a factor for one of:
    a first number of slots in the TBS for a PUSCH repetition Type A of the first number of PUSCH repetitions in the repetition unit, or
    a second number of nominal repetitions in the TBS for a PUSCH repetition Type B of the second number of PUSCH repetitions in the repetition unit; and
  transmitting the PUSCH repetitions with scaling based on the scaling parameter indicated in the scheduling DCI.

2. The method of claim 1, wherein the TDRA field comprises a PUSCH list for multiple PUSCH transmissions, the PUSCH list including a number of slots for TBS determination for each of the multiple PUSCH transmissions.

3. The method of claim 2, wherein the PUSCH list further comprises one or more of:
  a physical downlink control channel (PDCCH) to PUSCH slot offset,
  a mapping type,
  a starting symbol,
  a symbol length, or
  a number of single repetitions for repetition.

4. The method of claim 1, wherein the scaling parameter applies to a PUSCH repetition type having slots for the PUSCH repetitions.

5. The method of claim 1, wherein the scaling parameter applies to a PUSCH repetition type having consecutive symbols for the PUSCH repetitions.

6. The method of claim 1, wherein the TBS of the PUSCH transmission is based on at least one of a maximum number of physical resource blocks (PRBs), a maximum number of slots, a maximum number of symbols, or a maximum modulation order.

7. A method of wireless communication at a user equipment (UE), comprising:
  determining a transport block size (TBS) of a physical uplink shared channel (PUSCH) transmission based at least in part on a set of PUSCH resources corresponding to a set of PUSCH repetitions for transmission over a repetition unit comprising a plurality of single repetitions, wherein the TBS is based on a total number of resource elements (REs) that is calculated based on a minimum of:
    a largest average number of REs per slot multiplied by a number of the plurality of single repetitions, and
    a number of per physical resource block (PRB) REs over the plurality of single repetitions; and
  transmitting the PUSCH repetitions with the TBS determined over the repetition unit comprising the plurality of single repetitions.

8. The method of claim 7, wherein the UE applies a different overhead configuration to determine the TBS for the set of PUSCH repetitions than for a single PUSCH transmission.

9. The method of claim 7, wherein the number of per PRB REs is calculated based on a duration that is greater than 14 symbols.

10. The method of claim 7, wherein the PUSCH repetitions with the determined TBS is based on at least one of a maximum number of physical resource blocks (PRBs), a maximum number of slots, a maximum number of symbols, or a maximum modulation order.

11. A method of wireless communication at a user equipment (UE), comprising:
  determining a transport block size (TBS) of a physical uplink shared channel (PUSCH) transmission based at least in part on a set of PUSCH resources corresponding to a set of PUSCH repetitions for transmission over a repetition unit comprising a plurality of single repetitions;
  multiplexing uplink control information (UCI) with multiple repetitions of the PUSCH transmission for transmission as PUSCH repetitions over the repetition unit comprising the plurality of single repetitions, wherein the UCI is multiplexed in a plurality of single repetitions that are a subset of the multiple repetitions, wherein the plurality of single repetitions occurs at a beginning of the multiple repetitions; and
  transmitting the PUSCH repetitions with the UCI multiplexed over the multiple repetitions.

12. The method of claim 11, wherein the UCI comprises aperiodic channel state information (CSI).

13. The method of claim 11, wherein the UE spreads the UCI over the plurality of single repetitions beginning with a first repetition of the multiple repetitions.

14. The method of claim 11, wherein the UE repeats the UCI in each of the plurality of single repetitions beginning with a first repetition of the multiple repetitions.

15. An apparatus for wireless communication at a user equipment (UE), comprising:

memory; and at least one processor coupled to the memory, the at least one processor configured to:

receive scheduling downlink control information (DCI) indicating, in a time domain resource allocation (TDRA) field, a scaling parameter for a transport block size (TBS) of a physical uplink shared channel (PUSCH) transmission for transmission as PUSCH repetitions over a repetition unit comprising a plurality of single repetitions, wherein the scaling parameter for the TBS of the PUSCH transmission indicates a factor for one of:

a first number of slots in the TBS for a PUSCH repetition Type A of the first number of PUSCH repetitions in the repetition unit, or a second number of nominal repetitions in the TBS for a PUSCH repetition Type B of the second number of PUSCH repetitions in the repetition unit; and transmit the PUSCH repetitions with scaling based on the scaling parameter indicated in the scheduling DCI.

16. The apparatus of claim 15, wherein the TDRA field comprises a PUSCH list for multiple PUSCH transmissions, the PUSCH list including a number of slots for TBS determination for each of the multiple PUSCH transmissions.

17. The apparatus of claim 16, wherein the PUSCH list further comprises one or more of:

a physical downlink control channel (PDCCH) to PUSCH slot offset, a mapping type, a starting symbol, a symbol length, or a number of single repetitions for repetition.

18. The apparatus of claim 15, wherein the scaling parameter applies to PUSCH repetition type having slots for the PUSCH repetitions.

19. The apparatus of claim 15, wherein the scaling parameter applies to PUSCH repetition type having consecutive symbols for the PUSCH repetitions.

20. The apparatus of claim 15, wherein the TBS of the PUSCH transmission is based on at least one of a maximum number of physical resource blocks (PRBs), a maximum number of slots, a maximum number of symbols, or a maximum modulation order.

21. An apparatus of wireless communication at a user equipment (UE), comprising:

memory; and at least one processor coupled to the memory, the at least one processor configured to:

determine a transport block size (TBS) of a physical uplink shared channel (PUSCH) transmission based at least in part on a set of PUSCH resources corresponding to a set of PUSCH repetitions for transmission over a repetition unit comprising a plurality of single repetitions, wherein the TBS is based on a total number of resource elements (REs) that is calculated based on a minimum of:

a largest average number of REs per slot multiplied by a number of the plurality of single repetitions, and a number of per physical resource block (PRB) REs over the plurality of single repetitions; and transmit the PUSCH repetitions with the TBS determined over the repetition unit comprising the plurality of single repetitions.

22. The apparatus of claim 21, wherein the at least one processor is further configured to:

apply a different overhead configuration to determine the TBS for the set of PUSCH repetitions than for a single PUSCH transmission.

23. The apparatus of claim 21, wherein the number of per PRB REs is calculated based on a duration that is greater than 14 symbols.

24. The apparatus of claim 21, wherein the PUSCH repetitions with the determined TBS is based on at least one of a maximum number of physical resource blocks (PRBs), a maximum number of slots, a maximum number of symbols, or a maximum modulation order.

25. An apparatus for wireless communication at a user equipment (UE), comprising:

memory; and at least one processor coupled to the memory, the at least one processor configured to:

determine a transport block size (TBS) of a physical uplink shared channel (PUSCH) transmission based at least in part on a set of PUSCH resources corresponding to a set of PUSCH repetitions for transmission over a repetition unit comprising a plurality of single repetitions;

multiplex uplink control information (UCI) with multiple repetitions of the PUSCH transmission for transmission as PUSCH repetitions over the repetition unit comprising the plurality of single repetitions, wherein the UCI is multiplexed in a plurality of single repetitions that are a subset of the multiple repetitions, wherein the plurality of single repetitions occurs at a beginning of the multiple repetitions; and transmit the PUSCH repetitions with the UCI multiplexed over the multiple repetitions.

26. The apparatus of claim 25, wherein the UCI comprises aperiodic channel state information (CSI).

27. The apparatus of claim 25, wherein the at least one processor is further configured to:

spread the UCI over the plurality of single repetitions beginning with a first repetition of the multiple repetitions.

28. The apparatus of claim 25, wherein the at least one processor is further configured to:

repeat the UCI in each of the plurality of single repetitions beginning with a first repetition of the multiple repetitions.

* * * * *